(12) United States Patent
Chang et al.

(10) Patent No.: US 6,311,253 B1
(45) Date of Patent: Oct. 30, 2001

(54) METHODS FOR CACHING CACHE TAGS

(75) Inventors: Albert Chang, Yorktown Heights; Mark Charney; Robert K. Montoye, both of New York, all of NY (US); Thomas R. Puzak, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/336,953

(22) Filed: Jun. 21, 1999

(51) Int. Cl.$^7$ .................................................. G06F 12/08
(52) U.S. Cl. ........................................................ 711/122
(58) Field of Search ..................................... 711/122, 128

(56) References Cited

U.S. PATENT DOCUMENTS

| | | | |
|---|---|---|---|
| 5,864,671 | * 1/1999 | Hagersten et al. | 711/122 |
| 5,897,651 | * 4/1999 | Cheong et al. | 711/3 |
| 6,138,209 | * 10/2000 | Krolak et al. | 711/128 |
| 6,157,980 | * 12/2000 | Arimilli et al. | 711/3 |

OTHER PUBLICATIONS

O Krafta et al., "An Empirical Evaluation of Two Memory-Efficient Directory Methods," Transactions on Computers, IEEE, 1990, pp. 138–147.

A. Seznec, "Decoupled Sectored Caches: conciliating low tag implementation cost and low miss ratio," Conf. Proc.–Annual International Symposium on Computer Architecture, IEEE, 1994, pp. 384–393.

Wang et al., "Minimizing Area Cost of On–Chip Cache Memories by Caching Address Tags," IEEE Transactions on Computers, vol. 46, No. 11, Nov. 1997, pp. 1187–1201.

* cited by examiner

*Primary Examiner*—Matthew Kim
*Assistant Examiner*—Christian P. Chace
(74) *Attorney, Agent, or Firm*—F. Chau & Associates, LLP (57) ABSTRACT

A method for storing information in a computer memory system includes maintaining an $M^{th}$ level storage system including an $M^{th}$ level data store for storing data, an $M^{th}$ level full directory for storing a set of tags corresponding to the data, and an $M^{th}$ level partial directory for storing a subset of the tags. The partial directory is accessible faster than the full directory. Upon an M-1 level miss corresponding to a request for data, a congruence class corresponding to the request is fetched from the partial directory when it is present therein; otherwise, it is fetched from the full directory. The requested data is retrieved from the data store when it is present in the congruence class; otherwise, it is retrieved from a next level of the memory system. The tags in the partial directory may be full tags, partial tags, or a combination thereof.

31 Claims, 6 Drawing Sheets

FIG. 1

I. Full Directory
(conventional)

II. MRU and next-MRU directory entries

III. Partial directory entries

IV. MRU and next-MRU directory entries and partial entries

METHODS FOR CACHING CACHE TAGS

BACKGROUND

1. Technical Field

The present invention relates generally to computer processing systems and, in particular, to methods for caching cache tags.

2. Background Description

A cache memory (hereinafter "cache") is a small, fast, redundant memory used to store the most frequency accessed parts of the main memory of a computer processing system. In the memory hierarchy of modern computer processing systems, cache memory is generally located immediately below the highest level, namely the central processing unit (CPU) registers. The cache can be divided into multiple distinct levels, with most current systems having between one and three levels of cache. Those three levels are generally referred to as L1, L2, and L3. Some of the levels may be on the same chip as the CPU (i.e., on the same semiconductor substrate), or entirely separate from the CPU. For example, an L1 cache is built into or packaged within the CPU chip (and is thus referred to as "on-chip").

Generally, each cache includes two conventional memories: a data memory and a tag memory (also referred to as a "directory" memory). Fixed-size regions of main memory referred to as cache lines are stored in the data memory of the cache. The address of each cache line contained in the data memory is stored in the directory memory, as well as other information (state information), including the fact that a valid cache line is present. A congruence class refers to a group of T cache lines where a particular address is allowed to reside.

As stated above, the cache is intended to hold the most active portions of the main memory. Accordingly, the computer hardware dynamically allocates parts of the cache for portions of the main memory deemed most likely to be accessed soon. Many caches are associative (also referred to as content-addressable). In an associative memory, the address of a memory location is stored along with its content. When a request for data is made by the CPU, instead of reading the data directly from a main memory location, the cache is provided with an address and responds by providing data which may or may not be the requested data. If the requested data (e.g., a word) is found in the cache, then the request is referred to as a "hit". On the other hand, if the requested data is not found, then the request is referred to as a "miss". When a cache miss occurs, the main memory is accessed and the cache is updated to include the new (correct) data. Data is updated in the cache by the hardware copying cache lines which include the requested data.

When a cache line is copied into the cache, it is likely that another cache line must be removed from the cache. A least-recently-used (LRU) policy is often the basis for the choice. Conversely, a most-recently-used (MRU) is often the basis for selecting which cache lines are copied into the cache.

Cache coherence (or cache consistency) refers to the process employed by a processor to manage multiple copies of data (e.g., a particular cache line) residing in multiple caches. Such data management is required to prevent the data from being lost or overwritten. Many modern computer processing systems implement some form of multiple-reader-single-write protocol to achieve cache coherence.

The performance of a memory system can be measured to some degree by performance parameters such as latency and bandwidth. The term "latency" refers to the delay from when the processor first requests a word from memory until that word is available for use by the processor. That is, the latency of a memory request is the time period required for the memory system to produce the result of the request to the processor. The term bandwidth refers to the rate at which information can be transferred from the memory system. That is, the bandwidth of a memory system is the rate at which the memory system can accept memory requests and produce the results of the requests.

With respect to large caches (for example, 64MB), one of the problems of supporting the same is the large amount of directory space area required to track the contents of the data arrays. As a result, there is pressure on cache designers to increase the line size of large caches. It is well known that, with a fixed capacity, increasing the cache line size reduces the required directory space. For example, each doubling in line size removes one bit from each tag. Unfortunately, this can result in poor performance if those cache lines are shared.

The standard way of supporting large caches with small directories, that is, increasing the cache line size, results in an inefficient use of the cache. Since cache lines are typically only ½ utilized, much of the cache line is brought into the cache but never used. To reduce the resulting negative effects on memory bandwidth, the lines are typically "sectored" to permit only those sections of the cache line that are actually required to reside in the cache; the unrequired sections need not be cached. However, since many of the sectors in a sectored cache are empty, the cache designers could typically have gotten by with a much smaller cache with shorter cache lines. Since smaller caches are typically faster than larger caches due to physical constraints, the benefits of the larger caches are reduced by increasing the line size and adding sectoring-bits. Large caches with long cache lines are slower, inefficiently used, and can require more memory bandwidth to maintain each line. Thus, it would be desirable and highly advantageous to have a method that allows the use of a large cache, and provides fast access to cached data.

SUMMARY OF THE INVENTION

The present invention is directed to methods for caching cache tags. According to the present invention, a method is provided that allows the use of a large cache, and fast access to an important subset of the cache tags. The invention maintains the benefits of short (e.g., 128 bytes) cache lines (as opposed to, e.g., 1024 bytes). Moreover, the invention allows the use of a conventional, smaller L3-cache (e.g., 4-8MB) where no external tags are required.

According to one aspect of the invention, there is provided a method for storing information in a computer memory system. The method includes the steps of: maintaining an $M^{th}$ level storage system including an $M^{th}$ level data store for storing data, an $M^{th}$ level full directory for storing a set of tags corresponding to the data stored in the data store, an $M^{th}$ level partial directory store for storing a subset of the tags stored in the full directory, wherein the partial directory store is accessible faster than the full directory; upon an M-1 level storage system miss corresponding to a request for data, determining whether a congruence class corresponding to the request is present in the partial directory store; fetching the congruence class from the partial directory store when the congruence class is present therein, and from the full directory when the congruence class is not present in the partial directory store; and retrieving the requested data from the data store when the requested data is present in the congruence class, and from a next level of the memory system when the requested data is not present in the congruence class.

According to another aspect of the invention, there is provided a method for storing information in a computer memory system. The method includes the steps of: maintaining an $M^{th}$ level storage system including an $M^{th}$ level data store for storing data, an $M^{th}$ level full directory store for storing a set of tags corresponding to the data stored in the data store, an $M^{th}$ level partial directory for storing a subset of the tags stored in the full directory store, each of the tags in the subset having N-bits, wherein N is less than a total number of bits corresponding to each tag in the set, and the partial directory is accessible faster than the full directory; upon an M-1 level storage system miss corresponding to a request for data, the request including a request tag corresponding to the requested data, determining whether N-bits of the request tag match N-bits of a tag in the partial directory; fetching the requested data and a tag corresponding to the matching tag from the data store and the full directory store, respectively, when the N-bits of the request tag match the N-bits of the tag in the partial directory; and providing the fetched data to an object requesting the data, when all of the bits of the fetched tag match all of the bits of the request tag.

According to yet another aspect of the invention, there is provided a method for storing information in a computer memory system. The method includes the steps of: maintaining an $M^{th}$ level storage system including an $M^{th}$ level data store for storing data, an $M^{th}$ level full directory store for storing a set of full tags corresponding to the data stored in the data store, an $M^{th}$ level partial directory for storing a subset of the tags stored in the full directory store, wherein the subset includes at least some of the full tags of the set and at least some partial tags having N-bits, N being less than a total number of bits corresponding to each tag in the set, and the partial directory is accessible faster than the full directory; upon an M-1 level storage system miss corresponding to a request for data, the request including a request tag corresponding to the requested data, determining whether the request tag matches one of a full tag and N-bits of a partial tag in the partial directory; retrieving the requested data from the data store, when the request tag matches the full tag; fetching the requested data and a full tag corresponding to the partial tag from the data store and the full directory store, respectively, when the request tag matches the N-bits of the partial tag; and providing the fetched data to an object requesting the data, when all of the bits of the fetched full tag match all of the bits of the request.

According to still another aspect of the invention, there is provided a method for storing information in a computer memory system. The method includes the steps of: maintaining an $M^{th}$ level storage system including an $M^{th}$ level data store for storing data, an $M^{th}$ level full directory store for storing a set of tags corresponding to the data stored in the data store, an $M^{th}$ level partial directory for storing a subset of the tags stored in the full directory store, wherein the partial directory is accessible faster than the full directory; upon an M-1 level storage system miss corresponding to a request for data, determining whether the request matches a tag in a congruence class in the partial directory; fetching, from the full directory store, other tags in the congruence class, when the request does not match the tag in the congruence class in the partial directory; determining whether the request matches any of the other tags in the congruence class in the full directory store; and fetching the requested data from the data store when the request matches one of the tag in the partial directory and any of the other tags in the full directory store, and from a next level of the memory system, when the request does not match the tag in the partial directory and any of the other tags in the full directory store.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to methods for caching cache tags. The present invention provides a cache-directory that is split into two parts. One of the two parts is smaller than the other part and, therefore, is accessible with a shorter latency (or more accesses per cycle). Our use of this split directory allows for the efficient use of a large cache memory with short cache lines.

It is to be understood that the present invention may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed.

Figure 1:
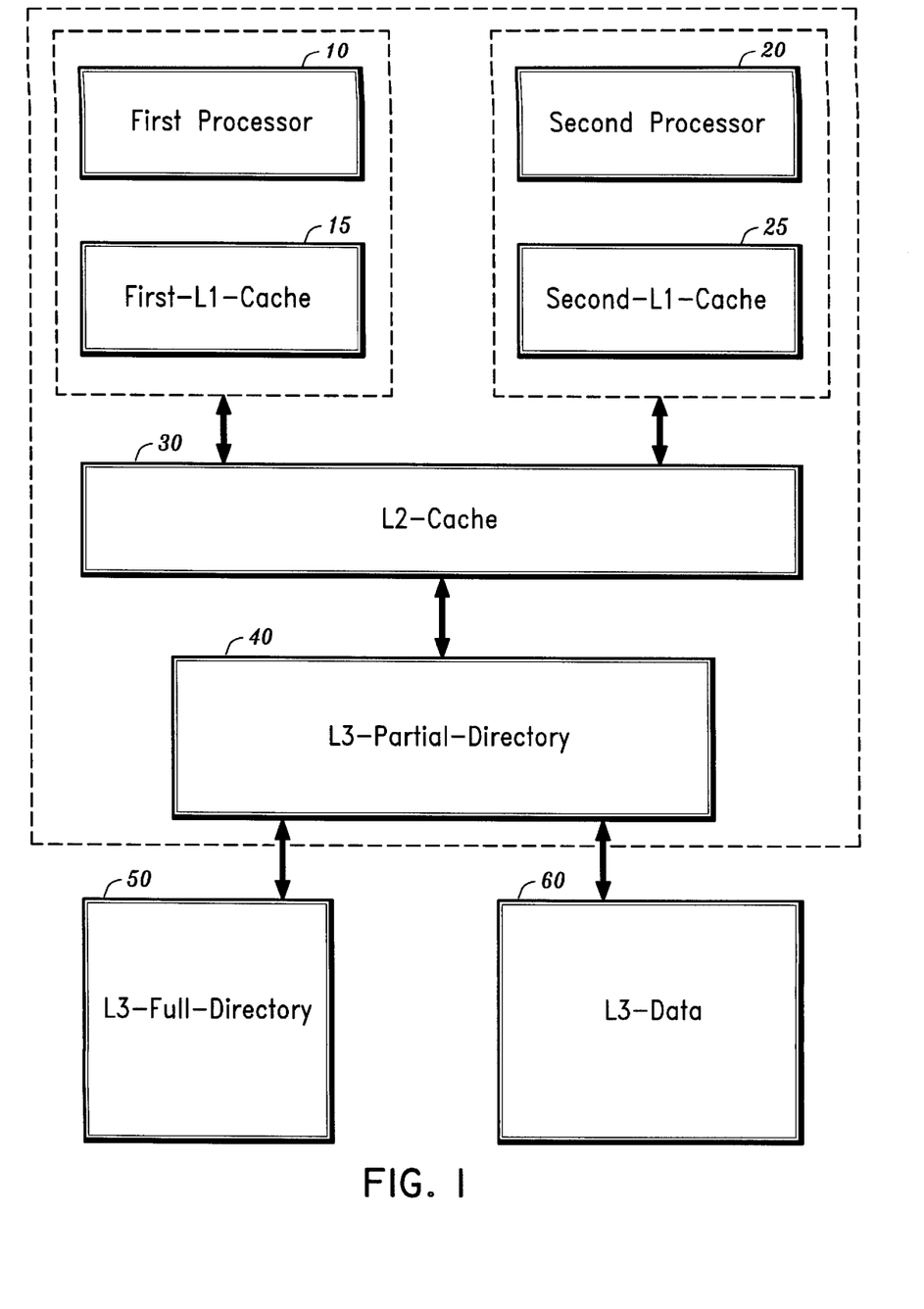
FIG. 1 is a block diagram illustrating a memory system that employs caching of cache tags according to an embodiment of the present invention.

FIG. 1 is a block diagram illustrating a memory system that employs caching of cache tags according to an embodiment of the present invention. It is to be appreciated that the terms "cache" and store may be used interchangeably herein. A first processor 10, a first primary cache(s) 15 (hereinafter "first-L1-cache"), a second processor 20, a second primary cache(s) 25 (hereinafter "second-L1-cache"), a secondary cache(s) 30 (hereinafter "L2-cache"), and a tertiary cache partial directory 40 (hereinafter "L3-partial-directory") are all located on the same chip 90. A tertiary cache full directory 50 (hereinafter "L3-full-directory") and tertiary cache data 60 (hereinafter L3-data) are located "off-chip".

The first-L1-cache 15, the second-L1-cache 25, and the L2-cache include both a respective data memory and a respective directory memory. The L3-full-directory 50 includes a directory memory corresponding to all the data stored in the L3-data 60. The L3-partial-directory 40 includes a directory memory corresponding to some of the data stored in the L3-data 60. That is, the L3-partial-directory 40 is a cache for the L3-full-directory.

The first processor 10 is operatively coupled to the first-L1-cache 15, and the second processor 20 is operatively coupled to the second-L1-cache 25. It is to be appreciated that while two processors are shown, the present invention may be utilized with any number of processors including only one processor. It is to be further appreciated that the quantity of the other components of FIG. 1 may also be increased and/or decreased, while still maintaining the spirit and scope of the present invention.

The first and second processors 10, 20 and their primary caches 15, 25, respectively, make requests to the L2-cache. When a request does not find the data that it requires in the L2-cache 30, the request is sent to the L3-partial-directory. There may be a multiplicity of L3-partial-directories in the system, wherein different addresses may map to different L3-partial-directories.

The L3-partial-directory 40 examines requests and looks to see if it either has or may have the requested data in the L3-data 60. If the L3-partial-directory 40 determines that the L3-data 60 definitely has the requested data, a request is sent to the L3-data 60 and the reply is sent to the cache or caches that initiated the request.

In some embodiments of the invention which are described below, it may not be possible to tell if the L3-data 60 definitely has the requested data. However, it can be deduced that the L3-data 60 either: (1) may have the requested data; or (2) definitely does not have the requested data; or (3) requires an access to the L3-full-directory 50 to fully resolve the presence or absence of the requested data in the L3-data 60.

The L3-full-directory 50 has a complete set of cache tags for the L3-data 60. However, since it has the full set of tags, it is necessarily large and slower than a smaller cache array. In addition, it is envisioned that due to the large size of the tertiary cache system (in particular, L3-full-directory 50 and L3-data 60), the tertiary cache system (50,60) would be on physically distinct chips (from the L3-partial-directory 40) and, thus, accessing it would require inter-chip communication.

When it is determined that the L3-data 60 does not have the requested data, the request is sent to the main memory of the computer (not shown). When a reply is received, the data is placed in the L3-data 60, the L3-partial-directory 40 and the L3-full-directory 50 are updated, and the data is sent to the other cache or caches that requested the data.

Three methods according to various embodiments of the present invention are described hereinbelow for managing and maintaining the L3-partial-directory 40. Each embodiment allows for different performance and area trade-offs.

Figure 2:
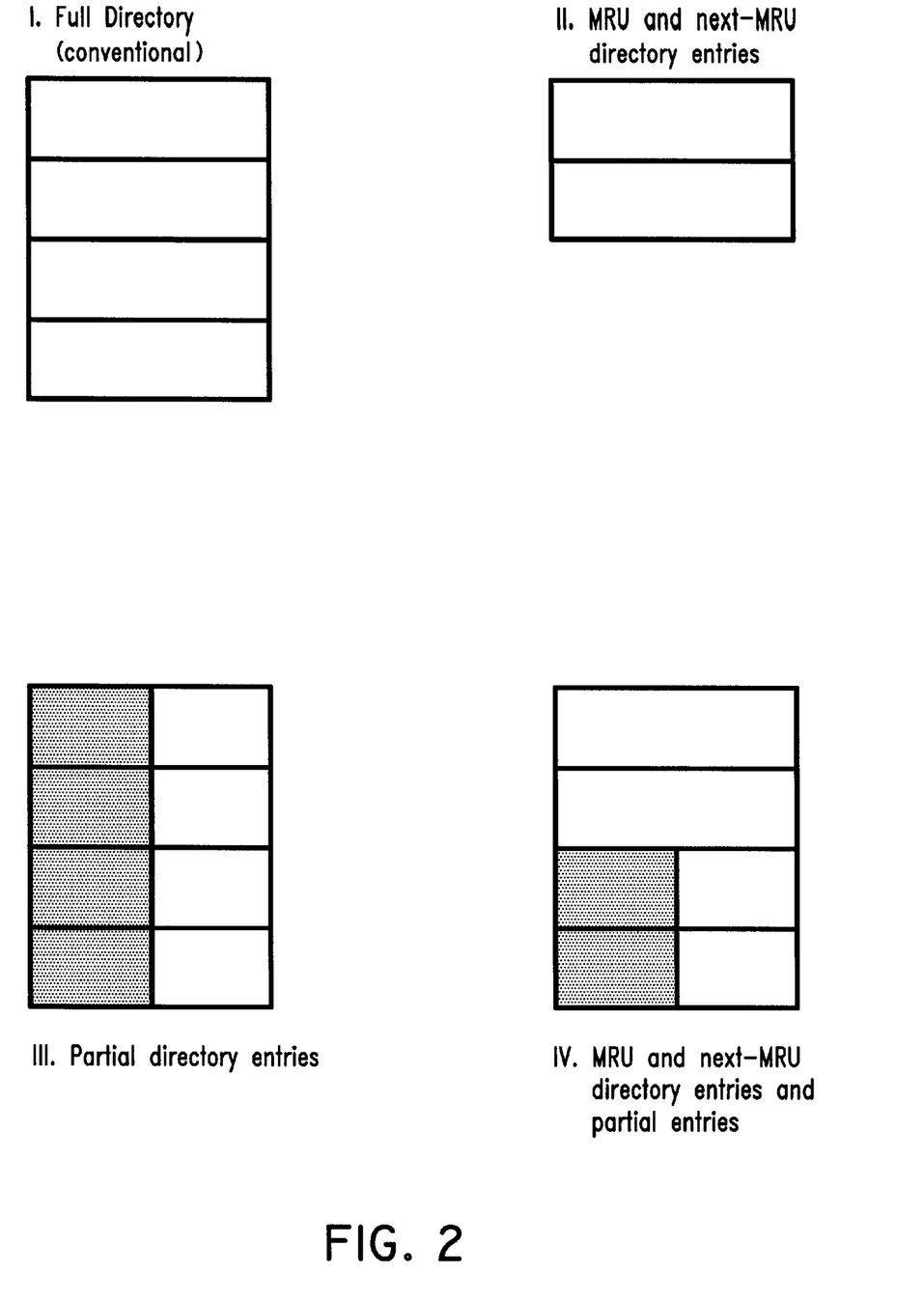
FIG. 2 is a block diagram illustrating four different directory structures that can be used to maintain tag and state information for a single congruence class.

FIG. 2 is a block diagram illustrating four different directory structures (I, II, III, IV) that can be used to maintain tag and state information for a single congruence class. The example of FIG. 2 corresponds to a 4-way associative cache. However, it is to be appreciated that other cache arrangements may be utilized while maintaining the spirit and scope of the present invention.

The first directory structure (I) is the conventional storage representation. There is one entry for each element of a congruence class. The first directory structure (I) may also be used when caching all the tags of a congruence class, as shown below with respect to FIG. 3. The other three directory structures are for the L3-partial-directory 40.

In the third (III) and fourth (IV) directory structures, part of a directory entry is omitted (the shaded region). This is because only part of the directory entry is stored in some cases in the L3-partial-directory 40, as will be described hereinbelow.

In the second directory structure (II), there is a entry for the most-recently-used (MRU) element of the congruence class and another entry for the next MRU element of the congruence class. In the third directory structure (III), there is one partial directory entry for each element of the congruence class. The fourth directory structure (IV) is a hybrid of the second and third directory structures. In the fourth structure (IV), there is one full entry for both the most-recently-used (MRU) element and next MRU element of a congruence class, and partial entries for the other elements of that congruence class.

One can easily envision systems where the most recently accessed tags in a congruence class are cached in fast storage, and only some of the other tags in that congruence class are maintained in fast storage. Since the most-recently-used object is most likely to be accessed again in the future, it makes sense to provide rapid hit-determination for the most recent (or several most recent) tags in a highly associative cache.

A brief description of a methodology for caching cache tags according to an embodiment of the present invention will now be given, followed by a detailed method for performing the same.

Initially, data is requested from the L2-cache 30, which results in a cache miss. Upon the cache miss, the L3-partial-directory 40 is checked for the tag corresponding to the requested data. If the tag is present in the L3-partial-directory 40, then the requested data can be loaded from the L3-data 60 which, for obvious capacity reasons, is located off-chip. If the L3-partial-directory 40 does not contain the tag, then the L3-full-directory 50 is checked. If the tag is not there, then the data must be fetched from the next level of the memory system. The benefits of quick access to the L3-data 60 are maintained for a subset of the data in the L3-data 60. This is practical since the processor can only use a certain amount of data.

When a miss occurs in the L3-partial-directory 40, a directory entry is allocated in the L3-partial-directory 40 and filled with the information from the L3-full-directory 50, if the L3-full-directory 50 has the information. When a miss occurs in both the L3-partial-directory 40 and the L3-full-directory 50, directory entries are allocated in the L3-partial-directory 40 and the L3-full-directory 50 and filled with the information from the next level of the memory system, if the next level has the information.

On cache invalidations, the L3-full-directory 50 must be told and the L3-partial-directory 40 needs to be updated if it also has the data. If the L3-full-directory 50 is not tracking the contents of the L3-partial-directory 40 (via some inclusion mechanism, of which there are many), then all cache invalidations must be communicated to the L3-partial-directory 40. However, if the L3-full-directory 50 is tracking the contents of the L3-partial-directory 40, then only those invalidations for things present in the L3-partial-directory 40 need to be sent to the L3-partial-directory 40. This inclusion would reduce the bandwidth requirements of the L3-partial-directory 40.

As an optimization to the above methodology, several directory entries can be loaded into the L3-partial-directory 40 when it has a cache miss, or under the control of a prefetching mechanism (of which there are many). For example, when the directory entry for cache line X is loaded into the L3-partial-directory 40, then the directory entries for lines X+1, X+2, . . . X+N can also be loaded into the L3-partial-directory 40, since programs tend to have very sequential behavior in their cache miss patterns. Care must be taken not to displace lines from the L3-data 60 that are currently providing useful performance advantages. The L3-partial-directory 40 can use the LRU information to avoid replacing something that was recently used by the L3-partial-directory 40.

Figure 3:
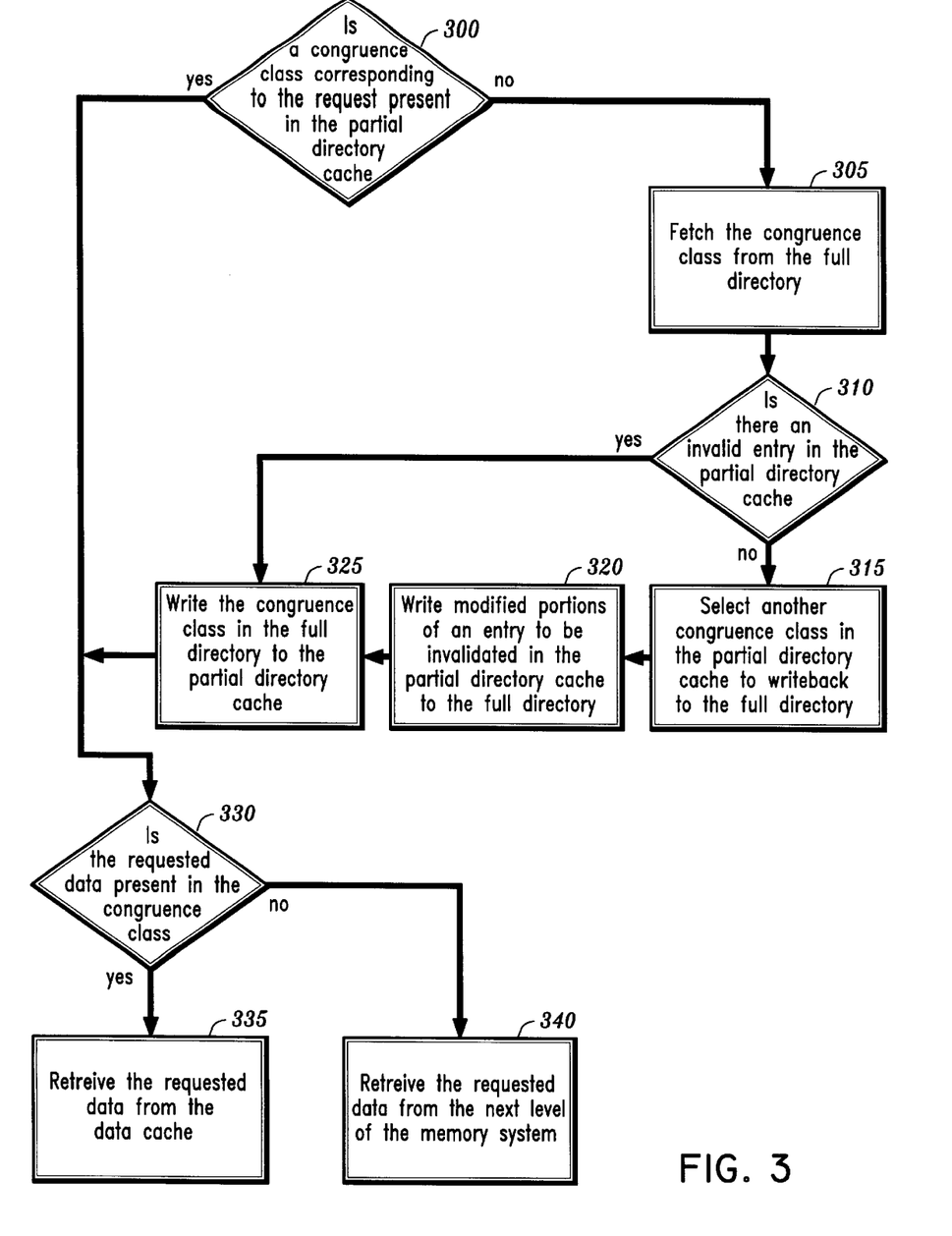
FIG. 3 is a flow chart of a method for caching cache tags according to an embodiment of the present invention.

FIG. 3 is a flow chart of a method for caching cache tags according to an embodiment of the present invention. A request for data from the L2-cache has been made, which resulted in a cache miss. Upon the cache miss, it is then determined whether or not a congruence class corresponding to the request is present in the L3-partial-directory 40 (step 300). If so, then the method proceeds to step 330. Else, the congruence class is fetched from the L3-full-directory 50 (step 305).

It is then determined whether or not there is an invalid entry in the L3-partial-directory 40 (step 310). If so, then the method proceeds to step 325. Else, a congruence class in the L3-partial-directory 40 is selected to writeback to the L3-full-directory 50 (step 315). The modified portions of an entry to be invalidated are written to the L3-full-directory 50 (step 320), and the method proceeds to step 325.

At step 325, the congruence class (fetched at step 305) is written to the L3-partial-directory 40, and then the method proceeds to step 330.

At step 330, it is determined whether or not the requested data is in the congruence class. If so, then the requested data is retrieved from the L3-data 60 (step 335). Else, the requested data is retrieved from the next level of the memory system (step 340).

A brief description of a methodology for caching partial cache tags according to an embodiment of the present invention will now be given, followed by a detailed method for performing the same. The brief description will describe a conventional cache which requires 4 megabits of tag memory, and a cache according to the present invention which requires only 2 megabits of tag memory.

In caching partial cache tags, the present invention provides a cache that requires only ½ the cache tag memory. That is, by caching, for example, only the low-order half of each tag we can do a quick test for the presence or absence of data in the cache. Since checking only the low-order bits of the full tag is generally insufficient for ensuring that the requested data is present, at least the complementary upper bits of the tag must be kept in an external memory to complete the data-presence-test. Those upper bits must also be fetched from the external memory when the lower bits indicate the presence of a possible match.

Consider a physical memory address space defined by 2^40 locations. That is, it is accessible with 40-bit addresses. Those 40 bits are used in disjoint groups to locate data in a cache. Some bits are used to define: (1) a tag; (2) a congruence class index; and (3) a position within the line (the line offset).

If the desired cache line size is 128 bytes (2^7), then 7 bits will constitute the line offset. Typically, the line offset bits are the least significant bits of an address.

If the cache is 128-Megabytes (2^27) and 8-way set-associative with 128 byte cache lines, then it would have (2^27/128) (which equals 2^20) lines, organized in groups of 8. There would be (2^27/128/8) (which equals 2^17) groups of 8, also known as congruence classes. Thus, 27−7−3=17 bits are required to construct the congruence class index.

If the addresses are 40 bits total, 7 bits are for the line offset, and 17 are for the congruence class index, then 16 bits remain that must be included in the tag. For the cache described above, we would require 16 bits for every line in the cache. As there are 2^20 lines, this would typically require 2^20*16bits=2^24bits or 4 megabits.

However, in such a case, a cache according to the present invention may be realized which requires only 2 megabits instead of the 4 megabits required by the conventional cache. By caching only the low-order 8 bits of each 16-bit tag, we can do a quick test for the presence or absence of data in the cache. Since checking only the low-order 8 bits of the 16-bit tag is generally insufficient to ensure that the requested data is present, at least the upper 8-bits of the tag must be kept in an external memory to complete the data-presence-test. Those upper bits also must be fetched from the external memory when the lower-8 bits indicate the presence of a possible match.

While only the low order bits are described above and below as being stored in the L3-partial-directory 40, it is to be appreciated that partial tags may be stored in the L3-partial-directory 40 that include any subset of the total number of bits corresponding to a full tag. For example, the upper order bits may be stored in the L3-partial-directory 40, with the low order bits being fetched in the case of a possible match. Alternatively, middle order bits may be stored in the L3-partial-directory 40, with the remaining lower and upper order bits being fetched in the case of possible match.

Figure 4:
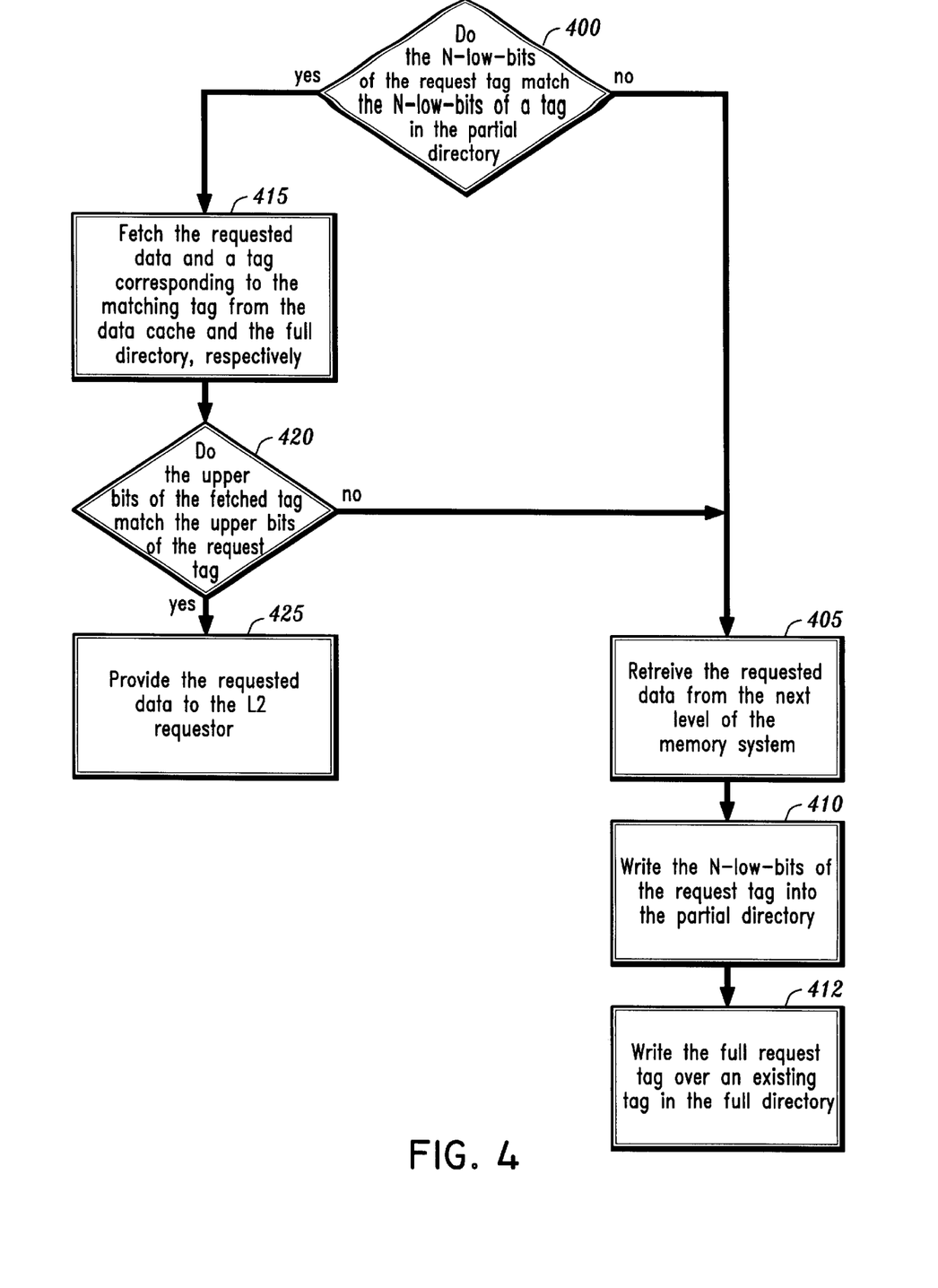
FIG. 4 is a flow chart of a method for caching partial cache tags according to an embodiment of the present invention.

FIG. 4 is a flow chart of a method for caching partial cache tags according to an embodiment of the present invention. A request for data from the L2-cache has been made, which resulted in a cache miss. The request includes a request tag corresponding to the requested data. Upon the cache miss, it is then determined whether or not the N-low-bits of the request tag match the N-low-bits of a tag in the L3-partial-directory 40 (step 400). If so, then the method proceeds to step 415. Else, the requested data is retrieved from the next level of the memory system (step 405). The N-low-bits of the request tag are written into the L3-partial-directory 40 (step 410), and the full request tag is written over an existing full tag in the L3-full-directory 50 (step 412).

At step 415, the data and corresponding full tag are fetched from the L3-data 60 and the L3-full-directory 50, respectively. It is then determined whether or not the upper bits of the request tag match the upper bits of the fetched tag (step 420). If so, then the requested data is provided to the L2 requestor (step 425). Else, the method returns to step 405.

The existing full tag to be overwritten at step 412 is selected based upon the results of steps 400 and 420. That is, the least-recently-used directory entry in the L3-full-directory 50 is overwritten when the result of the decision performed at step 400 is negative (i.e., the N-low-bits of the request tag do not match the N-low-bits of a tag in the L3-partial-directory 40). Alternatively, the full tag in the L3-full-directory 50 corresponding to the tag in the L3-partial-directory 40 that matched the N-low-bits of the request tag is overwritten when the result of the decision performed at step 420 is negative (i.e., the upper bits of the request tag match the upper bits of the tag fetched at step 415).

Figure 5:
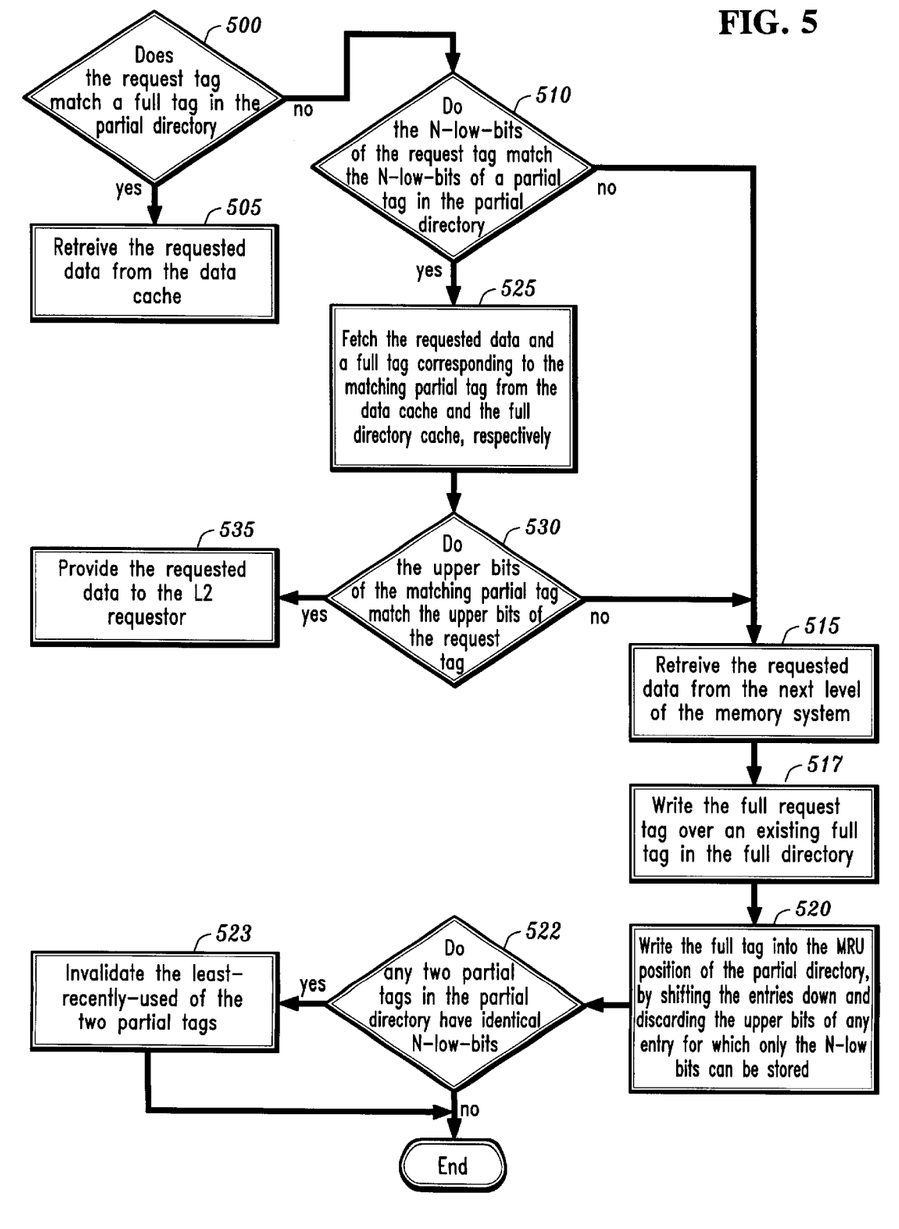
FIG. 5 is a flow chart of a method for caching full and partial cache tags according to an embodiment of the present invention.

It is to be appreciated that full tags and partial tags may be cached together in the L3-partial-directory 40. FIG. 5 is a flow chart of a method for caching full and partial cache tags according to an embodiment of the present invention. A request for data from the L2-cache has been made, which resulted in a cache miss. The request includes a request tag corresponding to the requested data. Upon the cache miss, it is determined whether or not the request tag matches a full tag in the L3-partial directory 40 (step 500). If so, then the requested data is retrieved from the L3-data 60 (step 505). Else, it is determined whether or not the N-low-bits of the request tag match the N-low-bits of a tag in the L3-partial-directory 40 (step 510). If so, then the method proceeds to step 525.

Else, the requested data is retrieved from the next level of the memory system (step 515), and the full request tag is written over an existing full tag in the L3-full-directory 50 (step 517). The full tag is also written over the MRU position of the L3-partial-directory 40 by shifting the other entries down, the high bits of any entry for which we can only store the low bits are discarded (step 520). It is determined whether or not any two partial tags in the L3-partial directory 40 have identical N-low-bits (step 522). If so, the least-recently-used partial tag of the two tags is invalidated (step 523), and the method terminates.

At step 525, the data and the full tag corresponding to the matching tag are fetched from the L3-data 60 and the L3-full-directory 50, respectively. It is then determined whether or not the upper bits of the request tag match the upper bits of the fetched tag (step 530). If so, then the fetched data is provided to the L2 requester (step 535). Else, the method returns to step 515.

The existing full tag to be overwritten at step 517 is selected based upon the results of steps 510 and 530. That is, the least-recently-used directory entry in the L3-full-directory 50 is overwritten when the result of the decision performed at step 510 is negative (i.e., the N-low-bits of the request tag do not match the N-low-bits of a tag in the L3-partial-directory 40). Alternatively, the full tag in the L3-full-directory 50 corresponding to the tag in the L3-partial-directory 40 that matched the N-low-bits of the request tag is overwritten when the result of the decision performed at step 530 is negative (i.e., the upper bits of the request tag do not match the upper bits of the tag fetched at step 525).

Figure 6:
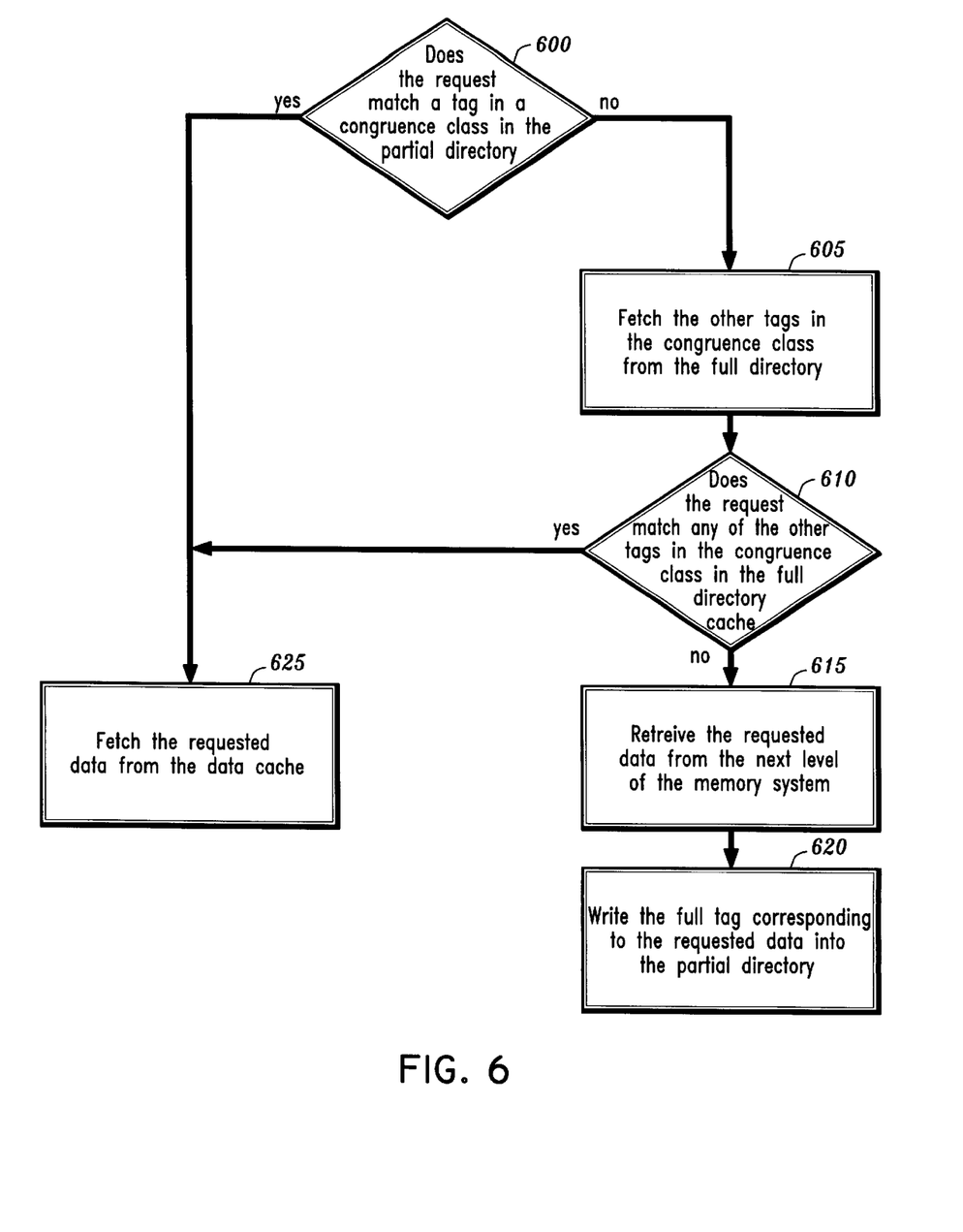
FIG. 6 is a flow chart of a method for caching cache tags according to another embodiment of the present invention.

FIG. 6 is a flow chart of a method for caching cache tags according to another embodiment of the present invention. The cached tags are selected based on a most-recently-used policy. A request for data from the L2-cache has been made, which resulted in a cache miss. Upon the cache miss, it is then determined whether or not the request matches a tag in a congruence class in the L3-partial directory 40 (step 600). If so, then the method proceeds to step 625.

Else, the other tags in the congruence class are fetched from the L3-full-directory 50 (step 605). It is then determined whether or not the request matches any of the other tags in the congruence class in the L3-full-directory (step 610). If so, then the method proceeds to step 622.

Else, the requested data is retrieved from the next level of the memory system (step 615). The full tag of the retrieved data is written into the L3-partial directory 40, possibly replacing an existing directory entry if necessary (step 620), and then the method terminates.

The full tag of the retrieved data is written into the L3-partial directory 40, possibly replacing an existing directory entry if necessary, and the method proceeds to step 625. At step 625, the requested data is fetched from the L3-data 60.

The present invention provides methods that allow the use of a large data cache, and fast access to an important subset of the cache tags for the large cache. As described above, full tags and/or partial tags may be cached. While the present invention has been described in terms of a tertiary cache system, it is to be appreciated that the present invention may be implemented to correspond to a cache system at any level. For example, the present invention may be implemented as a secondary cache system.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for storing information in a computer memory system, comprising the steps of:

maintaining an $M^{th}$ level storage system including an $M^{th}$ level data store for storing data, an $M^{th}$ level full directory for storing a set of tags corresponding to the data stored in the data store, an $M^{th}$ level partial directory store for storing a subset of the tags stored in the full directory, wherein the partial directory store is accessible faster than the full directory;

upon an M-1 level storage system miss corresponding to a request for data, determining whether a congruence class corresponding to the request is present in the partial directory store;

fetching the congruence class from the partial directory store when the congruence class is present therein, and from the full directory when the congruence class is not present in the partial directory store; and retrieving the requested data from the data store when the requested data is present in the congruence class, and from a next level of the memory system when the requested data is not present in the congruence class.

2. The method according to claim 1, further comprising the steps of:

determining whether an invalid entry exists in the partial directory store, upon said step of fetching the congruence class;

selecting another congruence class in the partial directory store to writeback to the full directory, when the invalid entry does not exist in the partial directory store;

writing modified portions of an entry to be invalidated in the partial directory store to the full directory; and writing the congruence class in the full directory to the partial directory store, upon one of writing the modified portions to the full directory and when the invalid entry does exist in the partial directory store.

3. The method according to claim 1, wherein the tags stored in the partial directory store are selected based on a most-recently-used policy.

4. The method according to claim 3, wherein the tags stored in the partial directory store for an individual congruence class correspond to more than one recently-used directory entry, starting from a most-recently-used directory entry.

5. The method according to claim 1, wherein each of the tags in the subset has N-bits, N being less than a total number of bits corresponding to each tag in the set.

6. The method according to claim 5, further comprising the steps of:
determining whether any two tags in the partial directory have identical N-bits; and
invalidating a least-recently-used tag of the two tags, when the two tags in the partial directory have identical N-bits.

7. The method according to claim 1, wherein some of the tags in the subset are full tags selected based on a most-recently-used policy, and remaining tags in the subset have N-bits, N being less than a total number of bits corresponding to each tag in the set.

8. The method according to claim 1, wherein said data store and said partial directory store comprise at least one of an instruction cache and a data cache.

9. A method for storing information in a computer memory system, comprising the steps of:
maintaining an $M^{th}$ level storage system including an $M^{th}$ level data store for storing data, an $M^{th}$ level full directory store for storing a set of tags corresponding to the data stored in the data store, an $M^{th}$ level partial directory for storing a subset of the tags stored in the full directory store, each of the tags in the subset having N-bits, wherein N is less than a total number of bits corresponding to each tag in the set, and the partial directory is accessible faster than the full-directory;
upon an M-1 level storage system miss corresponding to a request for data, the request including a request tag corresponding to the requested data, determining whether N-bits of the request tag match N-bits of a tag in the partial directory;
fetching the requested data and a tag corresponding to the matching tag from the data store and the full directory store, respectively, when the N-bits of the request tag match the N-bits of the tag in the partial directory; and
providing the fetched data to an object requesting the data, when all of the bits of the fetched tag match all of the bits of the request tag.

10. The method according to claim 9, further comprising the step of retrieving the requested data from a next level of the memory system, when the N-bits of the request tag do not match the N-bits of the tag in the partial directory.

11. The method according to claim 10, further comprising the step of writing the N-bits of the request tag into the partial directory, upon said step of retrieving the requested data from the next level of the memory system.

12. The method according to claim 9, further comprising the step of retrieving the requested data from a next level of the memory system, when all of the bits of the fetched tag do not match all of the bits of the request tag.

13. The method according to claim 12, further comprising the step of writing the N-bits of the request tag into the partial directory, upon said step of retrieving the requested data from the next level of the memory system.

14. The method according to claim 9, wherein the tags stored in the partial directory are selected based on a most-recently-used policy.

15. The method according to claim 14, wherein the tags stored in the partial directory store for an individual congruence class correspond to more than -one recently-used directory entry, starting from a most-recently-used directory entry.

16. The method according to claim 9, further comprising the step of writing the request tag over an existing tag in the full directory.

17. The method according to claim 16, wherein the existing tag corresponds to a least-recently-used directory entry in the full directory, when the N-bits of the request tag do not match the N-bits of the tag in the partial directory.

18. The method according to claim 16, wherein the existing tag corresponds to the fetched tag when all of the bits of the fetched tag do not match all of the bits of the request tag.

19. A method for storing information in a computer memory system, comprising the steps of:
maintaining an $M^{th}$ level storage system including an $M^{th}$ level data store for storing data, an $M^{th}$ level full directory store for storing a set of full tags corresponding to the data stored in the data store, an $M^{th}$ level partial directory for storing a subset of the tags stored in the full directory store, wherein the subset includes at least some of the full tags of the set and at least some partial tags having N-bits, N being less than a total number of bits corresponding to each tag in the set, and the partial directory is accessible faster than the full directory;
upon an M-1 level storage system miss corresponding to a request for data, the request including a request tag corresponding to the requested data, determining whether the request tag matches one of a full tag and N-bits of a partial tag in the partial directory;
retrieving the requested data from the data store, when the request tag matches the full tag;
fetching the requested data and a full tag corresponding to the partial tag from the data store and the full directory store, respectively, when the request tag matches the N-bits of the partial tag; and
providing the fetched data to an object requesting the data, when all of the bits of the fetched full tag match all of the bits of the request.

20. The method according to claim 19, further comprising the step of retrieving the requested data from a next level of the memory system when one of the request tag does not match the N-bits of the partial tag, and all of the bits of the fetched full tag do not match all of the bits of the request.

21. The method according to claim 20, further comprising the step of writing the full tag into a most-recently-used position of the partial directory, upon said step of retrieving the requested data from a next level of the memory system.

22. The method according to claim 21, wherein said writing step comprises shifting other directory entries down, and discarding bits other than the N-bits of any directory entry for which only the N-bits can be stored.

23. The method according to claim 19, further comprising the step of writing the request tag over an existing full tag in the full directory.

24. The method according to claim 23, wherein the existing full tag corresponds to a least-recently-used directory entry in the full directory, when the N-bits of the request tag do not match the N-bits of the partial tag in the partial directory.

25. The method according to claim 23, wherein the existing tag corresponds to the fetched full tag when the request tag does not match the full tag in the partial directory.

26. The method according to claim 23, further comprising the step of determining whether any two partial tags in the partial directory have identical N-bits.

27. The method according to claim 23, further comprising the step of invalidating the least-recently-used partial tag of the two partial tags in the partial directory having identical N-bits.

28. A method for storing information in a computer memory system, comprising the steps of:

maintaining an $M^{th}$ level storage system including an $M^{th}$ level data store for storing data, an $M^{th}$ level full directory store for storing a set of tags corresponding to the data stored in the data store, an $M^{th}$ level partial directory for storing a subset of the tags stored in the full directory store, wherein the partial directory is accessible faster than the full directory;

upon an M-1 level storage system miss corresponding to a request for data, determining whether the request matches a tag in a congruence class in the partial directory;

fetching, from the full directory store, other tags in the congruence class, when the request does not match the tag in the congruence class in the partial directory;

determining whether the request matches any of the other tags in the congruence class in the full directory store; and fetching the requested data from the data store when the request matches one of the tag in the partial directory and any of the other tags in the full directory store, and from a next level of the memory system, when the request does not match the tag in the partial directory and any of the other tags in the full directory store.

29. The method according to claim 28, further comprising the step of writing a full tag corresponding to the requested data into the partial directory, when the requested data is fetched from the next level of the memory system or the request matches any of the other tags in the congruence class in the full directory store.

30. The method according to claim 28, wherein the tags stored in the partial directory are selected based on a most-recently-used policy.

31. The method according to claim 30, wherein the tags stored in the partial directory store for an individual congruence class correspond to more than one recently-used directory entry, starting from a most-recently-used directory entry.

* * * * *